(12) United States Patent
Kandogan et al.

(10) Patent No.: US 10,664,501 B2
(45) Date of Patent: May 26, 2020

(54) DERIVING AND INTERPRETING USERS COLLECTIVE DATA ASSET USE ACROSS ANALYTIC SOFTWARE SYSTEMS

(71) Applicant: International Business Machines Corporation, Armonk, NY (US)

(72) Inventors: Eser Kandogan, Mountain View, CA (US); Mary Ann Roth, San Jose, CA (US); Ignacio Gabriel Terrizzano, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 669 days.

(21) Appl. No.: 15/290,923

(22) Filed: Oct. 11, 2016

(65) Prior Publication Data
US 2018/0101596 A1    Apr. 12, 2018

(51) Int. Cl.
*G06F 16/00* (2019.01)
*G06F 16/28* (2019.01)

(52) U.S. Cl.
CPC ................ *G06F 16/288* (2019.01)

(58) Field of Classification Search
CPC .. H04L 63/102; G06F 11/3476; G06F 11/323; G06F 16/182; G06F 16/26; G06F 17/40; G06F 16/288
USPC ........................................................ 707/736
See application file for complete search history.

(56) References Cited

U.S. PATENT DOCUMENTS

| | | | |
|---|---|---|---|
| 6,134,532 A | 10/2000 | Lazarus et al. | |
| 6,912,549 B2* | 6/2005 | Rotter | G06Q 50/24 |
| 7,231,381 B2 | 6/2007 | Li et al. | |
| 8,037,050 B2* | 10/2011 | Oliver | G06F 17/30489 |
| | | | 707/706 |
| 8,041,683 B1* | 10/2011 | Korolev | H04L 67/1097 |
| | | | 707/672 |
| 8,374,844 B2 | 2/2013 | Brun et al. | |
| 9,747,127 B1* | 8/2017 | Florissi | G06F 9/5027 |
| 10,148,533 B1* | 12/2018 | Hull | H04L 43/04 |
| 2005/0080821 A1* | 4/2005 | Breil | G06Q 40/02 |

(Continued)

OTHER PUBLICATIONS

IBM, "Lifecycle logging system for information assets", ip.com, Dec. 6, 2006, 2 pages, ip.com No. IPCOM000143740D, ip.com.

(Continued)

*Primary Examiner* — Thanh-Ha Dang
(74) *Attorney, Agent, or Firm* — Ference & Associates LLC (57) ABSTRACT

One embodiment provides a method, including: utilizing at least one processor to execute computer code that performs the steps of: receiving at least one heterogeneous system log from each of a plurality of systems, wherein each of the heterogeneous system logs comprises events corresponding to activities occurring within its corresponding system; for each of the plurality of systems, analyzing the events contained within its at least one heterogeneous system log to identify a plurality of entities, wherein each of the entities is associated with at least one of the activities; identifying relationships, across the plurality of systems, between entities within the plurality of entities; and linking (i) the entities having an identified relationship and (ii) the activities of those entities. Other aspects are described and claimed.

20 Claims, 5 Drawing Sheets

(56) References Cited

U.S. PATENT DOCUMENTS

| | | | | |
|---|---|---|---|---|
| 2005/0172010 | A1* | 8/2005 | Malone | G06F 17/30864 709/219 |
| 2005/0209876 | A1* | 9/2005 | Kennis | G06Q 10/06 726/1 |
| 2006/0036601 | A1* | 2/2006 | Dudley | G06F 11/3476 |
| 2006/0195461 | A1* | 8/2006 | Lo | G06F 17/30011 |
| 2007/0188494 | A1* | 8/2007 | Agutter | G06T 11/206 345/440 |
| 2008/0243751 | A1* | 10/2008 | Gormish | G06F 16/93 |
| 2009/0171731 | A1 | 7/2009 | Bobak et al. | |
| 2010/0023545 | A1* | 1/2010 | Gladkov | G06F 11/323 707/E17.005 |
| 2010/0161574 | A1* | 6/2010 | Davidson | G06F 16/217 707/705 |
| 2014/0114709 | A1 | 4/2014 | Olsen et al. | |
| 2014/0114818 | A1 | 4/2014 | Olsen et al. | |
| 2017/0024400 | A1* | 1/2017 | Roshchin | G06F 11/3476 |
| 2017/0031742 | A1* | 2/2017 | Jilani | G06F 11/079 |
| 2017/0109409 | A1* | 4/2017 | Nagy | G06F 16/2477 |
| 2017/0111245 | A1* | 4/2017 | Ishakian | G06Q 10/0633 |
| 2017/0134408 | A1* | 5/2017 | Nos | H04L 63/1416 |
| 2017/0139806 | A1* | 5/2017 | Xu | G06F 11/3612 |
| 2017/0180404 | A1* | 6/2017 | Bersch | G06F 16/285 |
| 2017/0220663 | A1* | 8/2017 | Zhao | G06F 16/35 |
| 2017/0279840 | A1* | 9/2017 | Zhang | H04L 63/1425 |
| 2017/0286190 | A1* | 10/2017 | Ishakian | G06Q 10/0633 |
| 2018/0091528 | A1* | 3/2018 | Shahbaz | H04L 63/1416 |
| 2018/0091529 | A1* | 3/2018 | Luger | H04L 63/1483 |
| 2018/0173451 | A1* | 6/2018 | Uttamchandani | G06F 12/0292 |

OTHER PUBLICATIONS

Anonymous, "Network Asset Activity Profiling", ip.com, Sep. 13, 2012, 6 pages, ip.com No. IPCOM000221591D, ip.com.

Anonymous, "PDSE: Method of categorizing and presenting aggregated posts from a plurality of social networking sites", ip.com, May 30, 2013, 4 pages, ip.com No. IPCOM000227973D, ip.com.

Jun Zhao et al., "An Identity Crisis in the Life Sciences", IPAW 2006, LNCS 4145, 16 pages, Springer-Verlag, Berlin, Germany.

Product, "Splunk", Website accessed on Jun. 10, 2016, 6 pages, Copy available at: www.splunk.com.

Wei Peng et al., "Mining Logs Files for Data-Driven System Management", SIGKDD Explorations, Jun. 2005, 8 pages, vol. 7, Issue 1, Copy available at: http://www.kdd.org/exploration_files/7-Peng.pdf, KDD.

Dolev Mezebovsky et al., "Pattern Mining in System Logs: Opportunities for Process Improvement", BPMDS '09, 10th Workshop on Business Process Modeling, Development, and Support, Jun. 8-9, 2009, Amsterdam, The Netherlands and EMMSAD '09, 21st Event, Jun. 13-14, 2009, Ljubljana, Slovenia, 14 pages, Springer-Verlag, Berlin, Germany.

Jian-Guang Lou et al., "Mining Invariants from Console Logs for System Problem Detection", USENIX ATC '10: 2010 USENIX Annual Technical Conference, Jun. 23-25, 2010, Boston, MA, USA, 8 pages, USENIX Association, Berkeley, CA, USA.

Doug Burdick et al., "Extracting, Linking and Integrating Data from Public Sources: A Financial Case Study", Bulletin of the IEEE Computer Society Technical Committee on Data Engineering, 2011, 8 pages, IEEE Computer Society.

Bogdan Alexe et al., "High-Level Rules for Integration and Analysis of Data: New Challenges", In Search of Elegance in the Theory and Practice of Computation, vol. 8000 of the series Lecture Notes in Computer Science, 2013, 20 pages, Springer-Verlag, Berlin, Germany.

Indrajit Bhattacharya et al., "Query-time Entity Resolution", Journal of Artificial Intelligence Research, Dec. 2007, 37 pages, AI Access Foundation, El Segundo, CA, USA.

* cited by examiner

DERIVING AND INTERPRETING USERS COLLECTIVE DATA ASSET USE ACROSS ANALYTIC SOFTWARE SYSTEMS

BACKGROUND

Many companies and businesses utilize multiple heterogeneous systems for storing, generating, and manipulating information. The companies may have these different systems because the information needs to be manipulated in different ways. For example, one user may need the information in a table or spreadsheet format, another user may need a subset of this information in a file format, while yet another user may have provided the source of that information in a database format. Furthermore, in order to meaningfully apply the varieties of the information to their respective needs, the users may need different pieces of the information or may need to perform transformations on given information to suit their needs.

Additionally, the format of the information or corresponding data for provision into a system may be unique to the particular system. For example, one user may only need a title corresponding to the information and the information itself, while another user may need the information itself, a corresponding description of the information, and the date the information was generated. Once the information has been input to a particular system, the system may change the format of the information and may add additional data. Therefore, the companies have different systems to facilitate the manipulation and generation of information needed by different users for different purposes.

However, once the information has been generated, other users may need or use this information. Thus, companies and businesses have systems in which information from one system can be shared across other systems, but oftentimes it is difficult to identify how or what information is available for sharing, who has accessed information that resulted from transformations to an original source, and the like. The sharing of information reduces the amount of time that has to be spent by employees generating and populating information into a system. For example, if one user has generated tables, in one system, containing information needed by another user of a second system, the user of the second system can access the information without having to generate the information. However, the second user may need to transform the information to suit the needs at hand. Additionally, the user may not have access to the system on which the information was originally stored or generated or may not be able to use the information in its original form, and the user who provided the information may wish to know that others are using the information that he/she provided.

BRIEF SUMMARY

In summary, one aspect of the invention provides a method, comprising: utilizing at least one processor to execute computer code that performs the steps of: receiving at least one heterogeneous system log from each of a plurality of systems, wherein each of the heterogeneous system logs comprises events corresponding to activities occurring within its corresponding system; for each of the plurality of systems, analyzing the events contained within its at least one heterogeneous system log to identify a plurality of entities, wherein each of the entities is associated with at least one of the activities; identifying relationships, across the plurality of systems, between entities within the plurality of entities; and linking (i) the entities having an identified relationship and (ii) the activities of those entities.

Another aspect of the invention provides an apparatus, comprising: at least one processor; and a computer readable storage medium having computer readable program code embodied therewith and executable by the at least one processor, the computer readable program code comprising: computer readable program code that receives at least one heterogeneous system log from each of a plurality of systems, wherein each of the heterogeneous system logs comprises events corresponding to activities occurring within its corresponding system; computer readable program code that, for each of the plurality of systems, analyzes the events contained within its at least one heterogeneous system log to identify a plurality of entities, wherein each of the entities is associated with at least one of the activities; computer readable program code that identifies relationships, across the plurality of systems, between entities within the plurality of entities; and computer readable program code that links (i) the entities having an identified relationship and (ii) the activities of those entities.

An additional aspect of the invention provides a computer program product, comprising: a computer readable storage medium having computer readable program code embodied therewith, the computer readable program code comprising: computer readable program code that receives at least one heterogeneous system log from each of a plurality of systems, wherein each of the heterogeneous system logs comprises events corresponding to activities occurring within its corresponding system; computer readable program code that, for each of the plurality of systems, analyzes the events contained within its at least one heterogeneous system log to identify a plurality of entities, wherein each of the entities is associated with at least one of the activities; computer readable program code that identifies relationships, across the plurality of systems, between entities within the plurality of entities; and computer readable program code that links (i) the entities having an identified relationship and (ii) the activities of those entities.

A further aspect of the invention provides a method, comprising: obtaining a plurality of system logs from a plurality of systems, wherein each of the system logs is unique to its corresponding system and wherein the system logs comprise activities performed by entities on at least one data asset within at least one of the plurality of systems; associating at least one entity with each of the data assets by analyzing the system logs to identify at least one entity that performed an activity on the data asset; identifying relationships between the entities across the plurality of systems by matching entities across the plurality of systems; and generating a relationship graph identifying the entities, data assets, and relationships between entities and data assets.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof. Furthermore, storage, access, and querying of entities and their relationships, as depicted in FIG. 5, may be performed any database management systems.

One problem with sharing information across many systems, especially in a manipulated form, is that a user may be unsure of where the information originated. Additionally, the user may be unsure of whether the information is the most current or accurate, or even if it is trustworthy information. For example, if a user uses information that has been populated on or generated from one system, the user may be unaware of whether the information that was used was the most up to date information. Additionally, the user is unlikely to know whether the information is updated on the system if the information changes. Another problem is that information across different systems may be different and the user does not know which system has the most current or accurate information. Some systems may allow users to provide notes or comments about where the information originated or when the information was last updated. However, such a system relies on a user to manually provide updates and comments. Thus, if a user forgets to provide comments, the information may appear to be out-of-date when it is actually the most current information.

Another problem with the sharing of information across systems is that it may be difficult to understand who created, populated, updated, or otherwise manipulated the information. For example, a user may know that a particular user fails to provide accurate or trustworthy information. However, because many users can access the same system and manipulate the information, it may be impossible to tell which user actually provided the information, or whether transformations on the original information may have compromised the integrity of the information. Current systems may allow a user to identify the last user to open the information. However, the last user may not be the same person who first populated the information and may also not be the last user to manipulate the information. Therefore, according to the system it may appear that an untrustworthy user populated the data, when in actuality it was a different user entirely.

Figure 3:
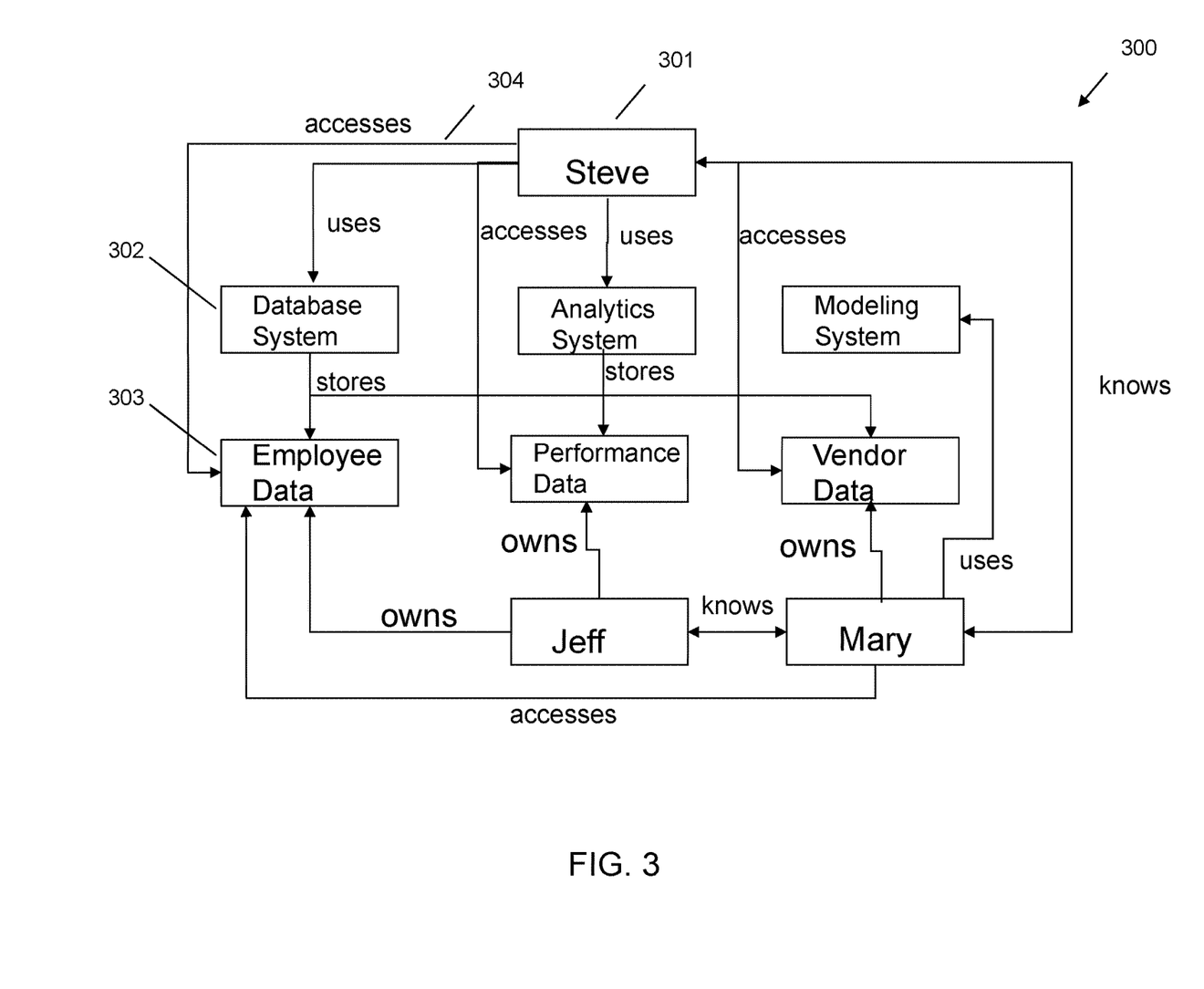
FIG. 3 illustrates an example relationship graph. This simplified graph contains only the following types of entities: person, tool, and dataset.

Accordingly, an embodiment provides a method of linking data assets, entities, activities, and relationships across a plurality of heterogeneous systems, for example, as shown in FIG. 3 which is described in more detail below. An embodiment may receive one or more heterogeneous system logs from each of a plurality of different systems. The logs from each of the systems may have different formats and/or information than logs from another system. In one embodiment, the logs may comprise events corresponding to activities performed by and on entities within the system. For example, a log may identify a copy event (i.e., activity in this example) performed by a user (i.e., entity in this example) using a particular software application or system (i.e., entity in this example).

An embodiment may analyze the system logs to identify a plurality of entities within the logs. For example, the system may identify a particular user, system, application, data asset (e.g., file, document, dataset, etc.), and the like. Each of these entities may then be associated with at least one of the events or activities. For example, the system may identify that a particular user added a table to a database. In addition to identifying the entities, an embodiment may identify relationships between the entities. For example, an embodiment may identify that a particular user generated a particular chart. Thus, the user has a relationship with the chart. An embodiment may complete this analysis of the system logs for each of the systems. For example, each system may have a unique software program (herein referred to as an "interpreter") that takes system-specific event messages from a system log and extracts pertinent information from those logs. Each system may have a unique interpreter because each system's logs may be in different formats and contain different information.

An embodiment may then identify relationships between entities across the plurality of systems. In one embodiment, the entities which are the same across the plurality of systems may be matched and designated as the same entity. For example, if a user "John" has been identified in one system, and the same user "John" is identified in another system, an embodiment may identify these users as having a relationship (i.e., in this example, the same user). Relationships across the systems may be identified not only for users, but also for other entities, for example, data assets. For example, the system may identify that the same tables have been accessed by three different users in three different systems. Thus, the system may identify the relationship between the tables which have been identified from the three different systems as the same tables. Once the relationships have been identified, an embodiment may link the entities and activities across the plurality of systems. Thus, the activities which have been undertaken on and by an entity can be identified across multiple systems, even though the systems may not have similar formats or information. Additionally, an embodiment may utilize the derived relationships to provide targeted recommendations, for example, other users for a user to communicate with, assets to access, or the like.

Such a system provides a technical improvement over current systems for identifying and sharing information because the system allows a user to identify the provenance and life cycle of information. The systems and methods as described herein access logs across a plurality of systems and identify entities, activities related to the entities, and relationships between entities and activities. Using these identified relationships the system can link the entities across a plurality of systems, even if the systems generate logs or information in different formats. Thus, when a user needs to use information, the user can identify the provenance of that information and be assured that the information is the most current, most accurate, and most trustworthy information available. The user can identify where the information originated, who populated or manipulated the information, and whether the information has been further manipulated since the original source. Thus, the systems and methods as described herein assist in supporting sharing and collaborative development of information and analysis of that information.

Figure 1:
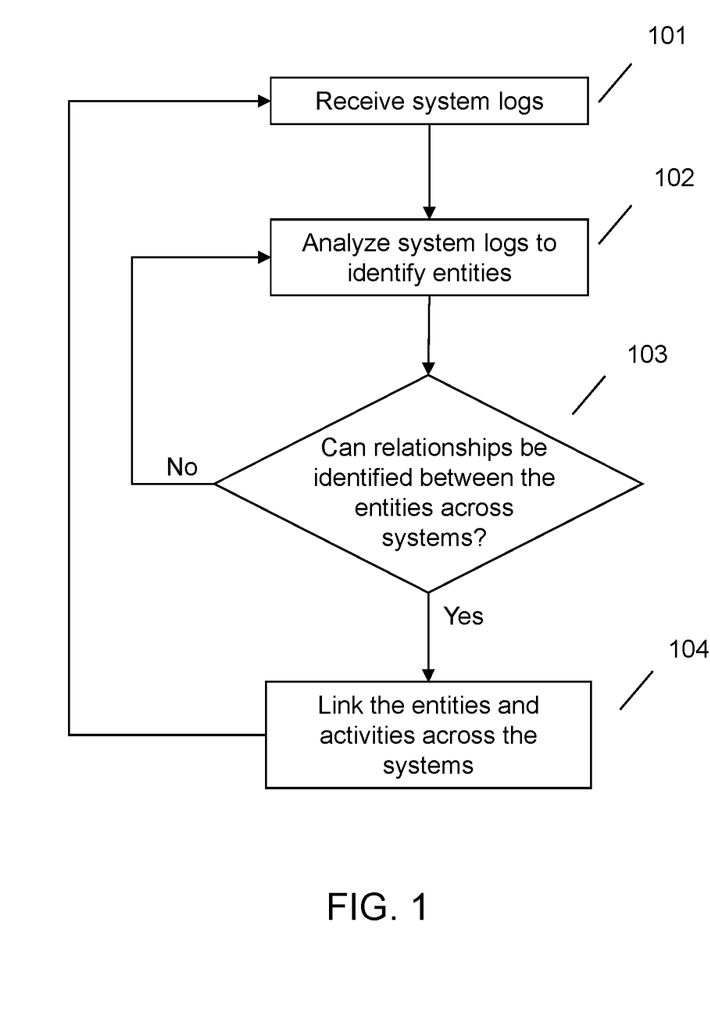
FIG. 1 illustrates a method of identifying relationships between entities derived from analyzing system logs across a plurality of systems.

Referring now to FIG. 1, an embodiment may receive one or more heterogeneous system logs from each of a plurality of systems. A log may be considered a recorded sequence of events related to a system. The system logs may be heterogeneous because each system may create different logs. Thus, a log from one system may contain information different from another system. Additionally, the format of the logs may be different from one system to another system. The logs may be a system-generated repository that records entity activities and interactions with the system. Accordingly, each system log may include events corresponding to activities occurring within a system. For example, a log may include an event indicating that a user created, uploaded, accessed, copied, or otherwise manipulated a data asset. The log event may include information in addition to the activity. Using the example above, in addition to the activity, the logged event also identifies who performed the activity, what was manipulated, at what time was the activity performed, the system the activity was performed on, the results of the activity, and the like.

The system logs may include events that have occurred at different times or different time intervals. For example, the system logs may include all the events from a single day, over a week, at a single point in time, and the like. The logs may include events from all time intervals from an origin time. For example, the system may collect all the logs that have been generated since a data asset was created. The logs from different systems do not have to be from the same time or time interval. For example, logs from one system may cover a single day, while logs from another system may cover an entire month. Thus, the logs are available for querying when requested by the system and, because the logs are updated by each system as events occur in the system, the logs will be up-to-date when the system queries the logs. Additionally, the logs do not have to be queried at the same time. For example, the system may use logs queried from one system on one day and logs collected from a second system a month later. In other words, the logs from each system do not have to be the same or equivalent to the logs from any other system.

At 102, an embodiment may analyze the system logs to identify a plurality of entities. An entity may include a user, application, system, data asset (e.g., file, document, database, table, graphic, etc.). In addition to identifying the plurality of entities, an embodiment may obtain metadata for each entity. The metadata may include information for a user, system, application, data asset, and the like, for example, user identification, email address, date of access, system identification, asset name, asset author, and other relevant metadata that may be used later by the system. The metadata may be associated with each of the entities and stored in a metadata store, for example, XMETA, MDM, or another metadata store. The system may also assign unique identifiers to each of the entities which may be used for analysis. The unique identifier may be based upon attributes derived from the log or extracted metadata. For example, the identifier may be expressed in a canonical form. As an example, a file may be identified by name, creation date, and MD5 hash. As another example, a table may be identified by column names and table-specific attributes.

The analysis may be completed using a system-specific interpreter, briefly discussed above. The interpreter may be unique to each system because each system may produce logs in different formats and containing different information. Therefore, the interpreter may be programmed to analyze the logs from a specific system or a system having a similar format. Thus, if, for example, two systems have similar logs and/or similar information one interpreter may be used on both systems. The interpreter may parse the data from the system logs to extract or derive entities (e.g., data assets, users, tools, etc.), activities, relationships between the entities and activities, and the like.

In one embodiment, analyzing may include filtering the system logs to not consider certain events or log entries. For example, analyzing the system logs may include determining whether the event is a system event (e.g., non-user related event, non-data related event, etc.) or a user event. A system event may include the system automatically backing up a document. Another example of a system event may include a user logging out of a system. The system events may be discarded or removed from the log analysis, leaving only the user or data-related events for analysis. In one embodiment, the filtering may include removing all user or data-related events that are not related to a particular data asset. For example, a user may indicate that a particular data asset should be analyzed. The filtering may then include removing all events that are unrelated to the desired entity. Thus, the interpreter may parse, filter, and choose relevant events that identify important events related to all entities or only a predetermined entity.

The interpreter may also identify relationships between different entities within a single system. For example, the system may parse a system log event to determine the activity and entities associated with the activity. The system may then identify that the entities associated with the activity have a relationship. As an example, John may generate a model from both a product and order database. Thus, the system may identify the activity as generating. The entities may include the user "John" and the data assets "product database" and "order database". Thus, the system may identify that John has a relationship with both the product database and the order database. The system may complete the relationship identification for each of the systems. As discussed before, the relationship identification may be completed for all events or may only be completed for events corresponding to a previously identified entity.

Figure 2:
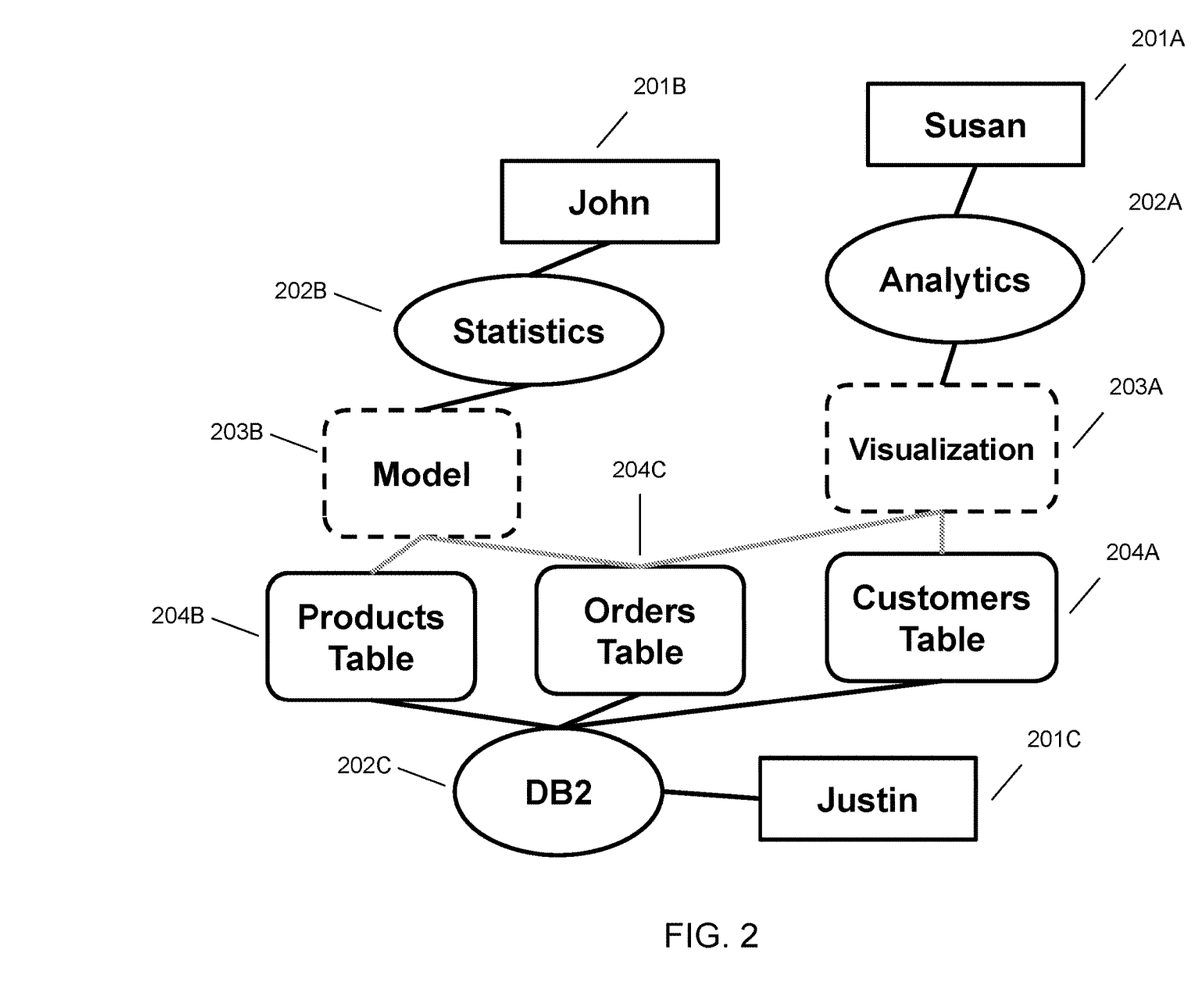
FIG. 2 illustrates an example where the same data are used across systems, by different users, for different purposes, and forms a basis for an entity relationship graph.

For example, FIG. 2 illustrates example activities across systems. FIG. 2 shows the user entities 201A, 201B, and 201C, the application or system entities 202A, 202B, and 202C, the resultant information entity 203A and 203B, and the data asset entities 204A, 204B, and 204C. As can be seen from FIG. 2, user entity John 201B used system entity Statistics Software 202B to create a resultant information entity Model 203B from data asset entities Products Table 204B, Orders Table 204C, and Customers Table 204A. The data asset entities Products Table 204B, Orders Table 204C, and Customers Table 204A were generated by user entity Justin 201C using system entity DB2 202C. The data asset entities Products Table 204B, Orders Table 204C, and Customers Table 204A were also used by user entity Susan 201A to generate resultant information entity Visualization 203A using system entity Analytics Software 202A. Thus, the graph depicts the relationships between each of the entities, even though each of the user entities 201A, 201B, and 201C, used a different system entity 202A, 202B, and 202C.

At 103, an embodiment may determine whether relationships between entities can be identified across a plurality of systems. To make this determination, an embodiment may employ an aggregator. The aggregator may include a software program that takes cross-system entity information generated from the interpreters and identifies and associates entities that are present in various systems from the plurality of systems. To determine if an entity from one system matches an entity from another system, an embodiment may match the entities across the systems. For example, if the entities have unique identifiers, the system may match the identifiers of the entities. As another example, for users whose email addresses' were extracted, an embodiment may match the email addresses of the users. The system may use and match the metadata that were previously extracted to determine if the entities are the same. An embodiment may also use entity resolution algorithms, techniques, or tools to determine if the entities represent the same entities across the plurality of systems.

If no relationships can be identified at 103, an embodiment may attempt to rematch the entities across the systems. Alternatively, an embodiment may reanalyze the system logs to identify new or different entities. If, however, relationships across the plurality of systems can be identified, an embodiment may link the plurality of entities and activities across the plurality of systems at 104 using the identified relationships. The linking may be completed using the aggregator. The aggregator may not only identify relationships between the entities, as previously discussed, but the aggregator may also receive the previously identified relationships between entities and activities from each of the systems. For example, if a user has been identified as the same across a plurality of the systems, the system may link the relationships that were previously identified within each system, across the different systems. The aggregator can not only link the entities across the plurality of systems, but also link the activities and entities across and within the plurality of systems. Accordingly, the linking associates entities with each other across the plurality of systems.

The aggregator may also populate, build, and/or generate a graph depicting the links, relationships, entities, and activities across and within the plurality of systems. In one embodiment, the graph may comprise a relationship graph. The relationship graph may include nodes that represent entities and edges which connect at least two of the nodes or entities. The edges represent relationships between the connected nodes or entities. For example, FIG. 3 depicts an example relationship graph 300. The nodes, for example, 301, 302, and 303, represent the different nodes or entities. For example, 301 represents a user "Steve," 302 represents a system "Database System," and 303 represents information "Employee Data." The edges, for example, 304, represent the relationships between two entities. As an example, edge 304 illustrates that entity Steve 301, accesses 304 entity Employee Data 303. As should be understood by one skilled in the art, the process as described herein can continually be updated and ongoing.

Once all the entities and activities have been linked, a user can use this information to identify the provenance of a particular data asset, identify who may have the most current information, generate recommendations for assets to use, generate visualizations, and the like. As an example, the graph may be directly queried by the user. For example, a user may query the system to determine who has used a particular piece of data. Using the example in FIG. 2, if a user queries the graph requesting identification of who has used the data asset entities Products Table 204B, Orders Table 204C, and Customers Table 204A, the system may return information identifying user entities Susan 201A and John 201B as having used the data asset entities 204A, 204B, and 204C, and user entity Justin 201C as having generated the data asset entities 204A, 204B, and 204C. The graph may also be queried by the system. For example, when a user is attempting to generate information and needs additional information, the system may identify the user who may be most helpful in providing the requested information. As an example, a user may want to know if someone has created a similar report. The system may query the graph to determine if a similar report has been created and by who. The system may also be used to identify social communities, for example, communities of users who are using the same or parts of the same data. The system may then recommend connections to these other users in order for the user to be able to collaborate with the other users in generating new information.

Figure 4:
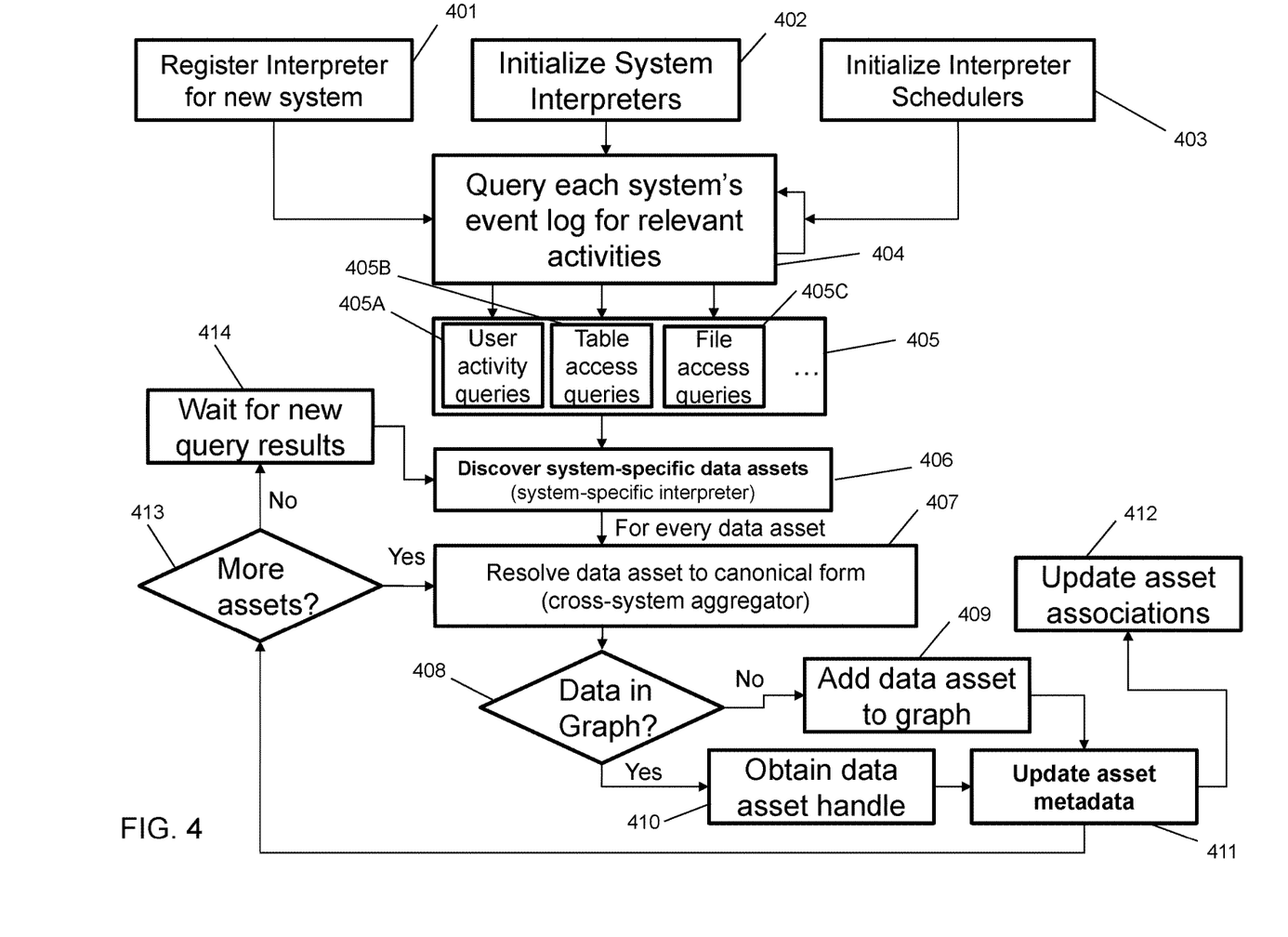
FIG. 4 illustrates an example flow of an example embodiment.
Figure 5:
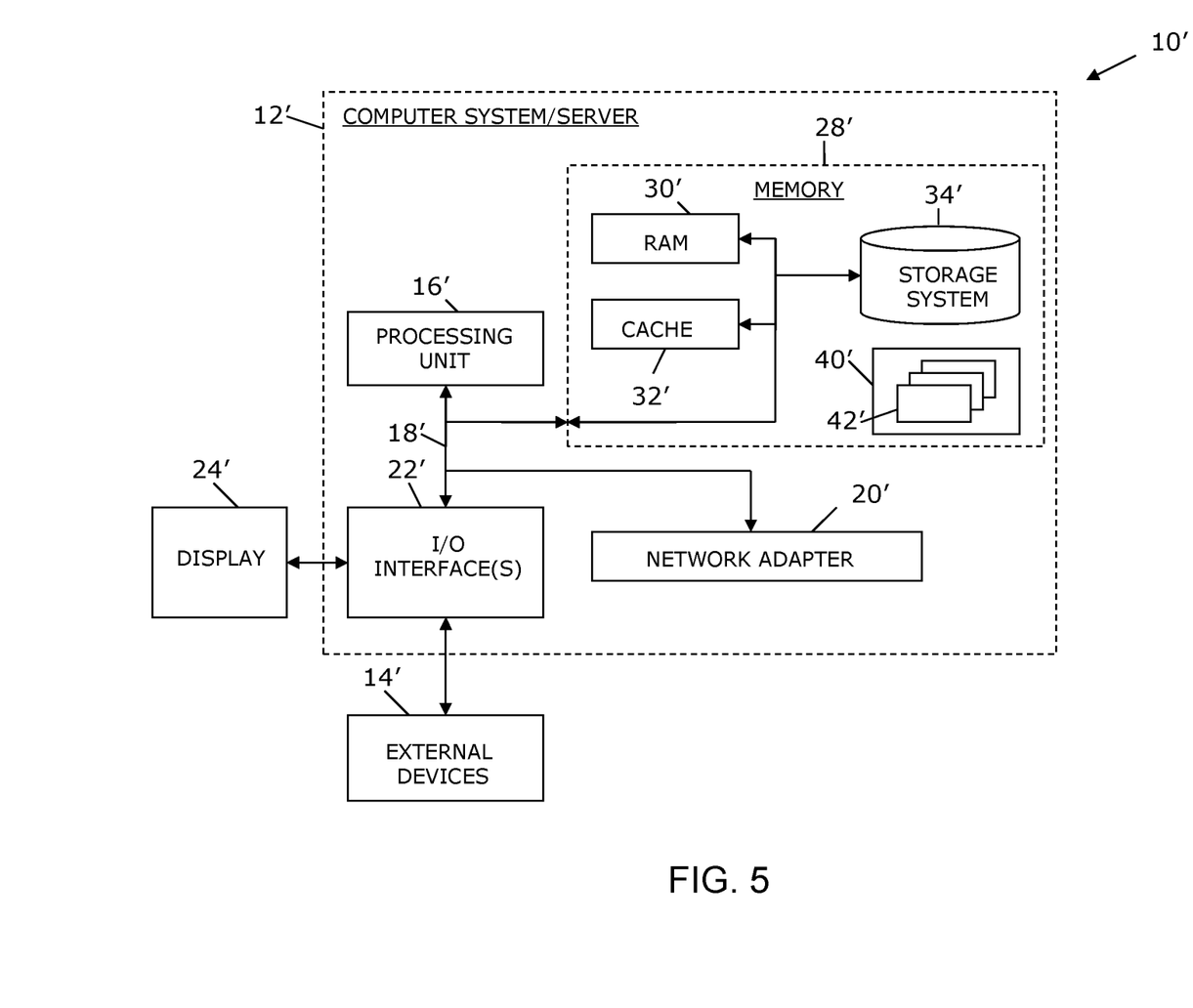
FIG. 5 illustrates a computer system.

FIG. 4 illustrates an example overall flow of the system. To query each system's event log for relevant activities at 404, the system may first register the interpreter for the system at 401, initialize the system interpreters at 402, and initialize the interpreter schedulers at 403. The system may continually query the system logs to gain up-to-date and accurate information. The query for relevant activities at 404, may result in different query results 405, for example, user activity queries 405A, table access queries 405B, file access queries 405C, and the like. From the queries (e.g., the events of the heterogeneous system logs, etc.), the system may discover system-specific data assets or entities at 406. For every data asset, the system may express or resolve the data asset to canonical form using the cross-system aggregator at 407. The system may then determine whether the information related to the data asset is in the relationship graph at 408. If the information is not in the relationship graph, the system may add the data asset to the graph at 409. If, however, the data asset is in the graph, the system may obtain the data asset handle or identifier at 410. After either adding the data asset to the graph at 409 or obtaining the data asset handle at 410, the system may update the asset metadata at 411. The system may also update the asset associations at 412. The system may then determine if additional assets exist at 413. If additional data assets exist, the system may return to 407 and resolve the data asset in canonical form. If, however, no new additional data assets exist, an embodiment may wait for additional query results at 414 and then discover the system-specific data assets from the new system logs at 406 and continue the method as described herein.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving at least one heterogeneous system log from each of a plurality of systems, wherein each of the heterogeneous system logs comprises events corresponding to activities occurring within a system corresponding to the heterogeneous system log;
for each of the plurality of systems, analyzing the events contained within at least one corresponding heterogeneous system log to identify a plurality of entities, wherein each of the plurality of entities is associated with at least one of the activities, wherein each of the plurality of entities comprises attributes derived from metadata and a unique identifier;

identifying relationships, across the plurality of systems, between entities within the plurality of entities, wherein the identifying comprises utilizing cross-system entity information and identifying entities that are present across more than one of the plurality of systems by comparing at least one attribute of the plurality of entities and identifying a match of at least one attribute of the entities and identifying entities having a match as the same entity; and linking (i) the entities having an identified relationship and (ii) the activities of those entities, wherein the linking comprises connecting the entities that are present across more than one of the plurality of systems.

2. The method of claim 1, wherein the analyzing comprises identifying relationships between the entities of a single system.

3. The method of claim 1, wherein the identifying relationships comprises identifying entities that are the same between at least one of the plurality of systems and at least another of the plurality of systems.

4. The method of claim 3, wherein each of the plurality of entities has a corresponding identifier and wherein the identifying entities that are the same comprises matching the identifiers.

5. The method of claim 1, wherein the analyzing comprises parsing the plurality of heterogeneous system logs to identify events.

6. The method of claim 1, wherein the analyzing comprises filtering the plurality of heterogeneous system logs and discarding events related to system events.

7. The method of claim 1, comprising generating a relationship graph of (i) the plurality of entities and (ii) relationships identified between entities.

8. The method of claim 7, wherein the relationship graph comprises:
    a plurality of nodes, wherein each node represents an entity; and
    a plurality of edges connecting at least two nodes, wherein each edge represents a relationship between two of the plurality of entities.

9. The method of claim 1, comprising identifying a provenance of a predetermined data asset by tracing a link of the data asset from one entity to another entity.

10. The method of claim 1, wherein the analyzing comprises obtaining metadata for (i) each of the events and (ii) each of the entities, within the heterogeneous system logs.

11. An apparatus, comprising:
    at least one processor; and
    a computer readable storage medium having computer readable program code embodied therewith and executable by the at least one processor, the computer readable program code comprising:
    computer readable program code that receives at least one heterogeneous system log from each of a plurality of systems, wherein each of the heterogeneous system logs comprises events corresponding to activities occurring within a system corresponding to the heterogeneous system log;
    computer readable program code that, for each of the plurality of systems, analyzes the events contained within at least one corresponding heterogeneous system log to identify a plurality of entities, wherein each of the plurality of entities is associated with at least one of the activities, wherein each of the plurality of entities comprises attributes derived from metadata and a unique identifier;
    computer readable program code that identifies relationships, across the plurality of systems, between entities within the plurality of entities, wherein the identifying comprises utilizing cross-system entity information and identifying entities that are present across more than one of the plurality of systems by comparing at least one attribute of the plurality of entities and identifying a match of at least one attribute of the entities and identifying entities having a match as the same entity; and
    computer readable program code that links (i) the entities having an identified relationship and (ii) the activities of those entities, wherein the linking comprises connecting the entities that are present across more than one of the plurality of systems.

12. A computer program product, comprising:
    a computer readable storage medium having computer readable program code embodied therewith, the computer readable program code comprising:
    computer readable program code that receives at least one heterogeneous system log from each of a plurality of systems, wherein each of the heterogeneous system logs comprises events corresponding to activities occurring within a system corresponding to the heterogeneous system log;
    computer readable program code that, for each of the plurality of systems, analyzes the events contained within at least one corresponding heterogeneous system log to identify a plurality of entities, wherein each of the plurality of entities is associated with at least one of the activities, wherein each of the plurality of entities comprises attributes derived from metadata and a unique identifier;
    computer readable program code that identifies relationships, across the plurality of systems, between entities within the plurality of entities, wherein the identifying comprises utilizing cross-system entity information and identifying entities that are present across more than one of the plurality of systems by comparing at least one attribute of the plurality of entities and identifying a match of at least one attribute of the entities and identifying entities having a match as the same entity; and
    computer readable program code that links (i) the entities having an identified relationship and (ii) the activities of those entities, wherein the linking comprises connecting the entities that are present across more than one of the plurality of systems.

13. The computer program product of claim 12, wherein the analyzing comprises identifying relationships between the entities of a single system.

14. The computer program product of claim 12, wherein the identifying relationships comprises identifying entities that are the same between at least one of the plurality of systems and at least another of the plurality of systems.

15. The computer program product of claim 12, wherein the analyzing comprises parsing the plurality of heterogeneous system logs to identify events.

16. The computer program product of claim 12, wherein the analyzing comprises filtering the plurality of heterogeneous system logs and discarding events related to system events.

17. The computer program product of claim 12, comprising identifying related entities to generate entity recommendations.

18. The computer program product of claim 12, comprising generating a relationship graph of the entities and relationships identified between entities, wherein the relationship graph comprises:
- a plurality of nodes, wherein each node represents an entity; and
- a plurality of edges connecting at least two nodes, wherein each edge represents a relationship between two of the plurality of entities.

19. The computer program product of claim 12, comprising identifying a provenance of a predetermined data asset by tracing a link of the data asset from one entity to another entity.

20. A method, comprising:
- obtaining a plurality of system logs from a plurality of systems, wherein each of the system logs is unique to a corresponding system and wherein the system logs comprise activities performed by entities on at least one data asset within at least one of the plurality of systems;
- associating at least one entity with each of the data assets by analyzing the system logs to identify at least one entity that performed an activity on the data asset, wherein each identified at least one entity comprises attributes derived from metadata and a unique identifier;
- identifying relationships between the entities across the plurality of systems by matching entities across the plurality of systems, wherein the identifying comprises utilizing cross-system entity information and identifying entities that are present across more than one of the plurality of systems by comparing at least one attribute of the plurality of entities and identifying a match of at least one attribute of the entities and identifying entities having a match as the same entity; and
- generating a relationship graph identifying the entities, data assets, and relationships between entities and data assets, wherein the generating comprises connecting the entities that are present across more than one of the plurality of systems and reflecting the connected entities within the relationship graph.

* * * * *